United States Patent
Neef

(10) Patent No.: US 7,464,464 B2
(45) Date of Patent: Dec. 16, 2008

(54) METHOD FOR PRODUCING A COVER THAT CAN BE PLACED ON THE END OF A MOTOR VEHICLE EXHAUST PIPE, AND A COVER PRODUCED ACCORDING TO THIS METHOD

(75) Inventor: Manfred Neef, Wilnsdorf-Flammersbach (DE)

(73) Assignee: Neef GmbH & Co. KG, Wilnsdorf (DE)

( * ) Notice: Subject to any disclaimer, the term of this patent is extended or adjusted under 35 U.S.C. 154(b) by 650 days.

(21) Appl. No.: 10/500,732

(22) PCT Filed: Feb. 10, 2003

(86) PCT No.: PCT/EP03/01290

§ 371 (c)(1),
(2), (4) Date: Jan. 14, 2005

(87) PCT Pub. No.: WO03/069140

PCT Pub. Date: Aug. 21, 2003

(65) Prior Publication Data

US 2005/0235478 A1    Oct. 27, 2005

(30) Foreign Application Priority Data

Feb. 12, 2002    (DE) ................ 102 05 649

(51) Int. Cl.
*B21D 51/16*    (2006.01)

(52) U.S. Cl. ............ 29/890.08; 29/890.8; 29/557

(58) Field of Classification Search ........... 29/557, 29/890.8; 72/348, 349, 379.2
See application file for complete search history.

(56) References Cited

U.S. PATENT DOCUMENTS

| | | | | |
|---|---|---|---|---|
| 848,144 | A * | 3/1907 | Wemlinger | 405/276 |
| 3,741,142 | A * | 6/1973 | Stuard | 413/14 |
| 4,722,127 | A * | 2/1988 | Pujol | 29/891.031 |
| 5,249,447 | A * | 10/1993 | Aizawa et al. | 72/46 |
| 5,924,188 | A * | 7/1999 | Tokunou et al. | 29/603.12 |
| 6,007,281 | A * | 12/1999 | Eriksson et al. | 409/132 |
| 6,041,611 | A * | 3/2000 | Palmer | 62/286 |
| 6,279,593 | B1 * | 8/2001 | Sheppard | 137/1 |
| 6,301,917 | B1 * | 10/2001 | Lacoste | 62/286 |
| 6,595,318 | B2 * | 7/2003 | Ebinger et al. | 181/227 |
| 6,827,173 | B2 * | 12/2004 | Lai | 180/309 |
| 2003/0057008 | A1 * | 3/2003 | Lai | 180/309 |
| 2005/0235478 | A1 * | 10/2005 | Neef | 29/558 |

FOREIGN PATENT DOCUMENTS

| | | |
|---|---|---|
| DE | G 88 13 792.9 | 4/1989 |
| DE | 298 05 486 U1 | 7/1998 |
| EP | 0 848 144 A1 | 6/1998 |
| JP | 59015624 | 1/1984 |
| JP | 08284657 | 10/1996 |

\* cited by examiner

*Primary Examiner*—David P. Bryant
*Assistant Examiner*—Donte Kirksey
(74) *Attorney, Agent, or Firm*—Pauley Petersen & Erickson

(57) ABSTRACT

A method for producing a cover, wherein a special steel blank is deep-drawn and can be placed on an end of a motor vehicle exhaust pipe. Immediately successive method steps makes it possible to economically produce a one-piece cover without subjecting the surface to deterioration and subsequently working the same.

12 Claims, 5 Drawing Sheets

METHOD FOR PRODUCING A COVER THAT CAN BE PLACED ON THE END OF A MOTOR VEHICLE EXHAUST PIPE, AND A COVER PRODUCED ACCORDING TO THIS METHOD

BACKGROUND OF THE INVENTION

1. Field of the Invention

This invention relates to a method for producing a cover made of a special steel blank which can be deep-drawn and placed on the end of a motor vehicle exhaust pipe, and a cover produced in accordance with this invention.

2. Discussion of Related Art

Known covers are used as an ornamentation on an end of an exhaust pipe protruding from the rear of a motor vehicle. For this reason the non-rusting basic material, the special steel, and the appearance of the surface of the cover are of decisive importance.

Similar known covers are bent from a special steel blank into a sleeve-shaped body and are welded together at the joint on the shell circumference. This requires a considerable outlay for labor, particularly during the manufacture and finishing work for the weld seam. Thus, covers produced in this way are very expensive.

SUMMARY OF THE INVENTION

It is one object of this invention to provide a method of the type mentioned above but in which covers can be produced in one piece without welding work and without the finished cover experiencing impairments which make the cover less valuable or even turn it into waste.

In accordance with this invention, this object is accomplished by the combination of the following method steps which follow each other directly: a) making a circular blank from a special steel plate; b) drawing cup-shaped beakers with a bottom, which is inclined with respect to the longitudinal axis, wherein diameters are uniform over an entire shell length, but are more and more decreased, and the shell lengths are more and more increased, are drawn in several deep-drawing operations; c) punching a centered hole (13) with a rim (14) which is ring-shaped toward the shell (12.4) into the bottom (11.4); d) cutting the shell (12.4) vertically with respect to the longitudinal axis (25) of the beaker (10.4) to the required length (Lo) and a condensate drain opening (16) and a fastening hole are cut into the shell (12.5); e) subsequently crimping the rim (14) of the bottom (11.4) is bent-in parallel with respect to the longitudinal axis (25) and is subsequently crimped into the beaker (10.6) to form an end (17) in the shape of an arc of a circle; and f) at the finish the end section (18) tapering the cut open front (15) of the beaker (10.7) for decreasing the diameter.

It is important that these method steps are performed directly, such as in short periods of time, one after the other. Because the axial dimension of the cover is considerable for a deep-drawing method, the deep-drawing process occurs in several deep-drawing steps with diameters decreased in steps and a shell length increased in steps. These are followed by the method steps for forming the two open front faces of the cover, wherein the crimped rim and the tapered end section of the cut-off shell result in the final shape of the cover by appropriate method steps.

In one embodiment, care is taken in the method steps, so the transition from the inclined bottom to the shell of the various deep-drawing steps is always rounded, so that no damage occurs, particularly in the transition area from the bottom to the shell of the drawn beaker.

Regarding the inclination of the bottom with respect to the longitudinal axis of the beaker the bottom is inclined with respect to the shell of the various deep-drawing steps at a diameter by approximately 70°, or 110°, with respect to the longitudinal axis.

So that the front face of the cover facing the motor vehicle, and possible openings and/or holes in the shell of the beaker can be cut in a simple manner, in one embodiment the cutting-off of the shell to the required length and the cutting of the condensate drain opening and/or fastening hole are performed together. These method steps can be performed together because they are performed in the same processing direction.

If prior to crimping of the end in the form of an arc of a circle the bore in the bottom is shaved, the crimped end of the beveled front of the beaker becomes uniform.

A cover produced in accordance with this invention is distinguished because it is embodied in one piece in a sleeve-like manner, wherein a front end, which is inclined with respect to the longitudinal axis, has an end crimped in the shape of an arc of a circle, and the other front end extending perpendicularly with respect to the longitudinal axis in the adjoining end section has a diameter which is less than the diameter of the remaining shell. The crimped end provides stiffening and avoids sharp edges, while the tapered end section stabilizes the drawn cover and prevents undesired contractions of the material because of tensions occurring in the material.

The shell of the sleeve-shaped cover has a condensate drain and a fastening hole.

BRIEF DESCRIPTION OF THE DRAWINGS

This invention is explained in greater detail in view of an exemplary embodiment represented in the drawings, wherein.

DESCRIPTION OF PREFERRED EMBODIMENTS

Figure 1:
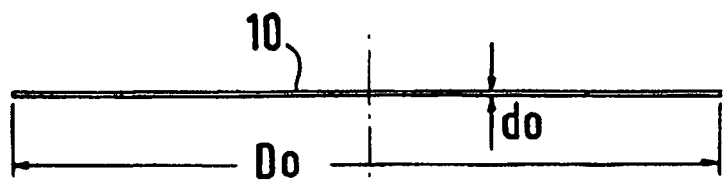
FIG. 1 is a front view of a circular blank as the initial basis for producing a cover made of special steel.

The circular blank 10 represented in a lateral view in FIG. 1 is produced, preferably cut, from a special steel plate which can be deep-drawn, of a diameter D1 of 190 mm, for example, and a thickness of 1 to 1.2 mm, for example.
}

Figure 2:
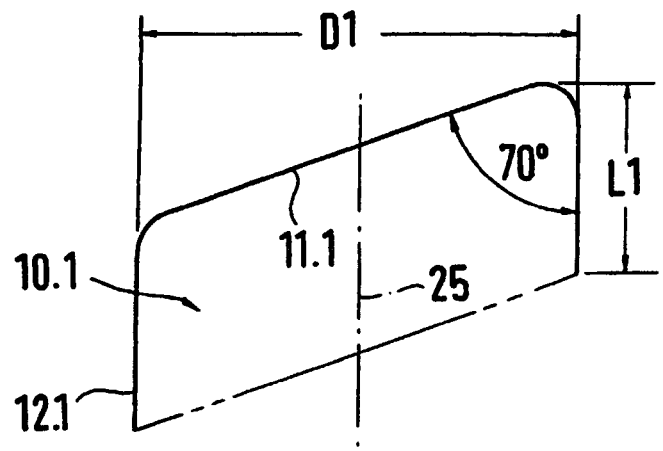
FIGS. 2 to 5 show diagrammatic views of four deep-drawing processes for beakers as the pre-products with increasingly reduced diameters and increasingly increased shell lengths.

In a first deep-drawing process, a beaker 10.1 with an inclined bottom 11.1 is drawn by a deep-drawing process, with a diameter D1=117.7 mm, and the shell 12.1 is brought to a shell length L1. In this case the inclination of the bottom 11.1 with respect to the longitudinal axis 25 of the beaker 10.1 on a diameter is 70° or 110°, as shown in FIG. 2.

Figure 3:
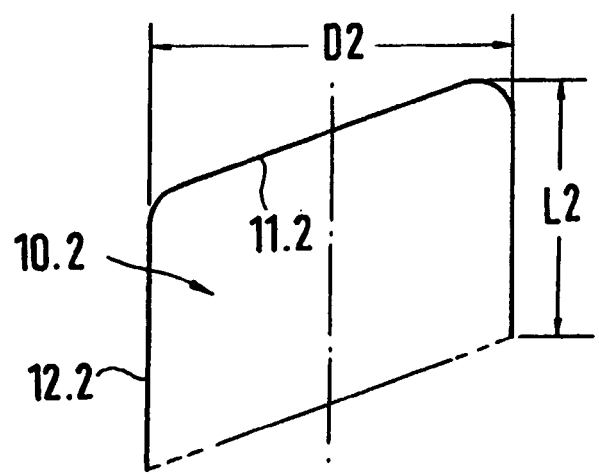

In the following second deep-drawing process, the beaker 10.2 is drawn with a smaller diameter D2=96.95 mm, but a greater length L2 of the shell 12.1, so that the beaker 10.1 in accordance with FIG. 1 becomes the beaker 10.2, as shown in FIG. 3.

Figure 4:
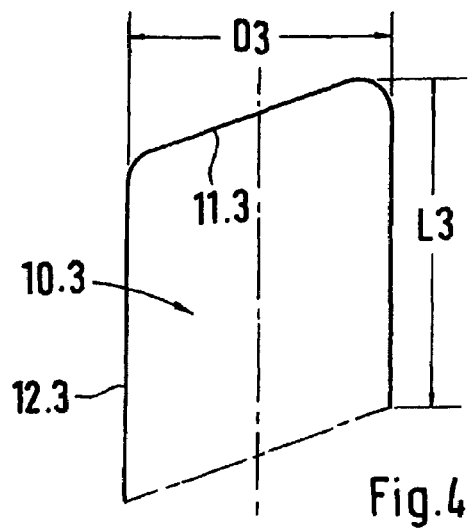

A further, third deep-drawing process follows, in which the beaker 10.2 in accordance with FIG. 3 is changed into a beaker 10.3 in accordance with FIG. 4, with a diameter D3=79.5 mm and a length L3 of the shell.

Figure 5:
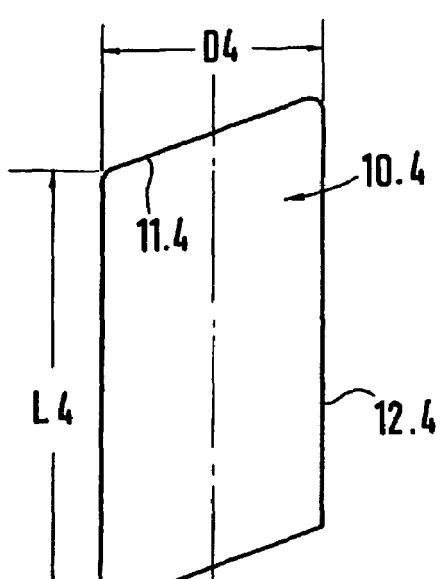

The deep-drawing process is ended in a fourth method step, in which finally the beaker 10.4 is created with the final diameter D4=68.7 mm and a length L4 of the shell 10.4 in accordance with FIG. 5. The lengths L1 to L4 result automatically because the initial circular blank 10 is defined.

Figure 6:
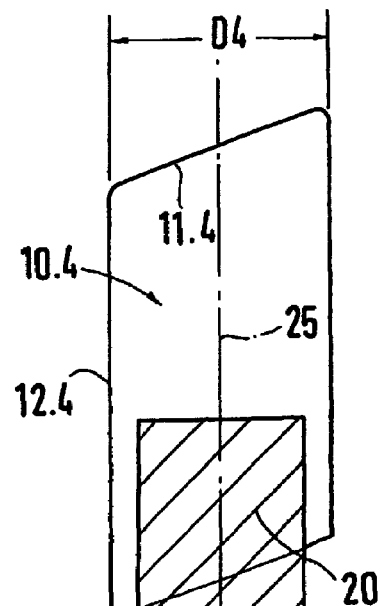
FIGS. 6 and 7 each shows a diagrammatic view of cutting and punching a hole in a bottom of a beaker.
Figure 7:
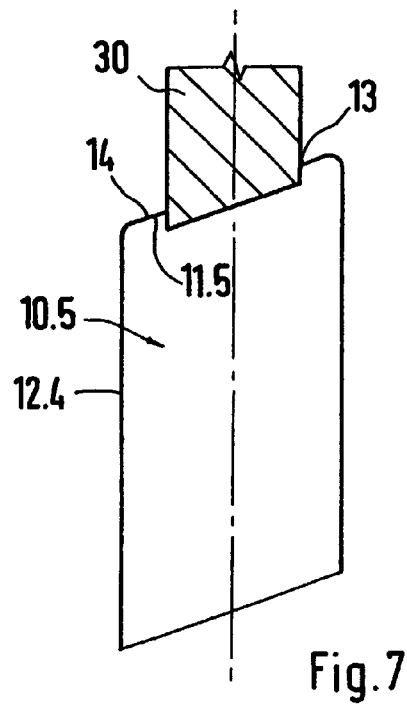

As FIGS. 6 and 7 show, the slide is trimmed with a clipping punch 20 and a centered hole 13 is punched into the bottom 11.5 with the punch 30, so that an annular rim 14 remains around the hole 13.

Figure 8:
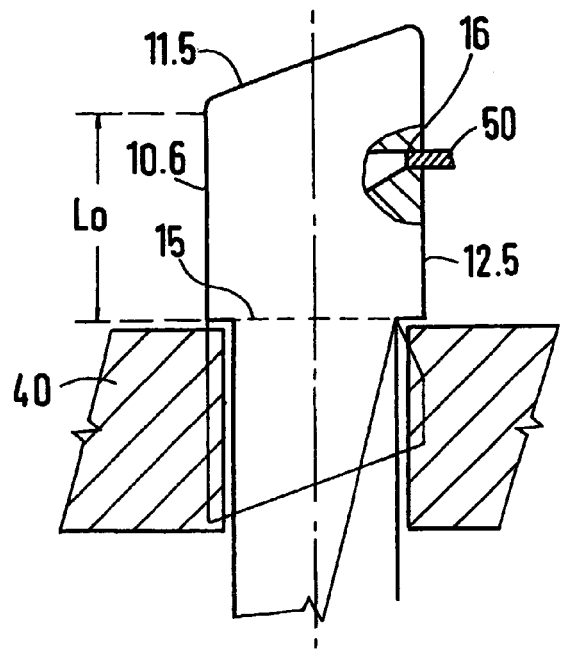
FIG. 8 shows a diagrammatic sectional view of cutting the shell of the beaker to size and cutting an opening and/or a bore into the shell of the beaker.

FIG. 8 shows a cutting tool 40 and a punching tool 50, by which the length Lo of the shell 12.5 of the beaker 10.5 in accordance with FIG. 7 is shortened to the required length, wherein the resultant front face 15 is oriented perpendicularly with respect to the longitudinal axis 25 of the beaker 10.6. A condensate drain 16 and a fastening hole are punched into the shell 12.5, wherein cutting of the shell 12.6 and punching of the condensate drain 16 and the fastening hole occur simultaneously, because both work directions of the processes are the same.

Figure 9:
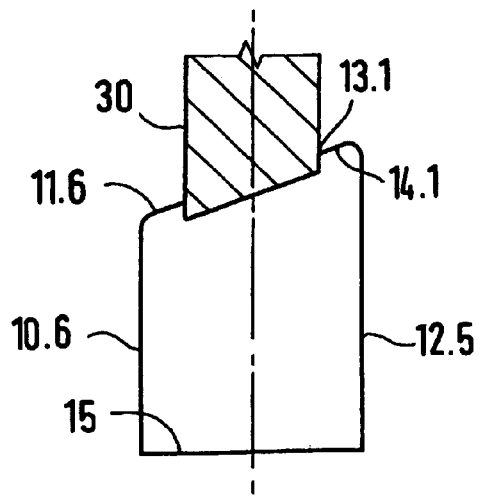
FIG. 9 shows shaving a hole in a bottom.

As FIG. 9 shows, the bore 13.1 can be shaved in order to position the rim 14.1 uniformly around the shell 12.5 of the beaker 10.6.

Figure 10:
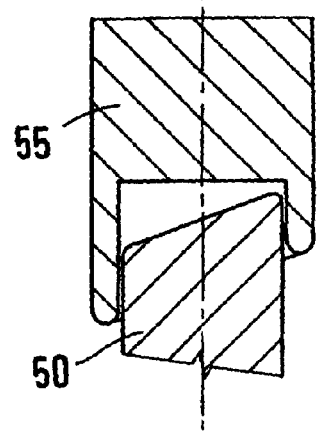
FIG. 10 shows a tool for the vertical alignment of the rim in the bottom.
Figure 11:
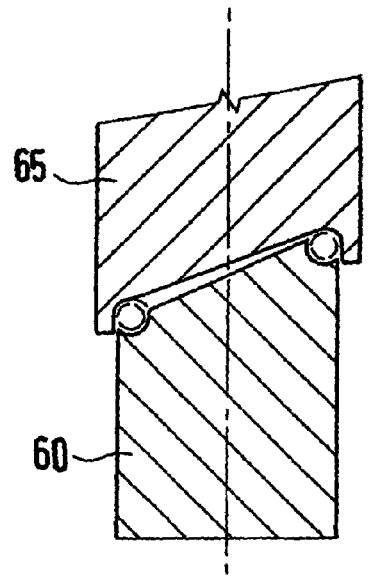
FIG. 11 shows a tool for crimping the rim.

Initially, an area of the rim 14.1 adjoining the hole 13.1 is crimped parallel with the longitudinal axis 25 of the beaker 10.6 by the two tools 50 and 55 and is thereafter shaped in the form of an arc of a circle by tool 60 and 65. In this case the tools 60 and 65 are matched in the form of a semicircle in the facing corner areas, as shown in FIGS. 10 and 11.

Figure 12:
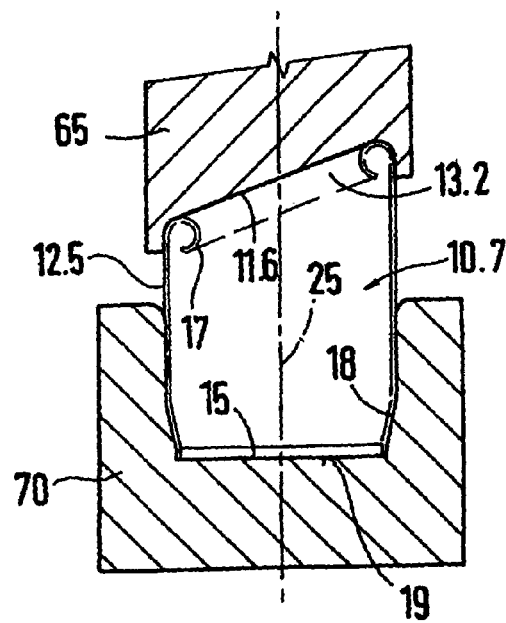
FIG. 12 shows tapering the end section of the shell.

As FIG. 12 shows, the finished front end 11.5 of the beaker is held by the tool 65, and a tool 70 tapers the end section 18 in the area of the cut-off front face 15 so that the diameter of the cover 10.7 in this area is reduced. In the process, the cover 10.7 is supported in the receiver 19 of the tool 70. The crimped end 17 in the area of the front face 11.6 not only prevents sharp edges but, together with the tapered end section 18 of the shell 12.5, is used for stabilizing the shaped cover 10.7, so that tensions caused by tensions in the material cannot result in an uncontrolled contraction of the material and impairment of the surface of the cover 10.7.

Figure 13:
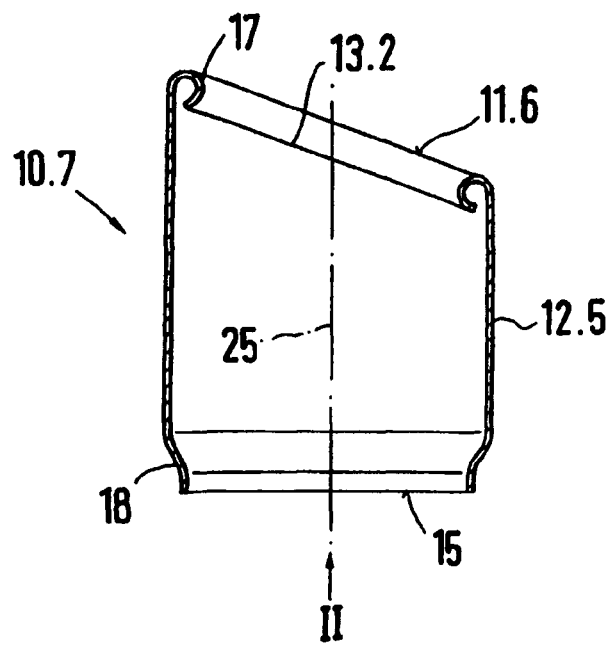
FIG. 13 shows a vertical section taken through the finished cover.
Figure 14:
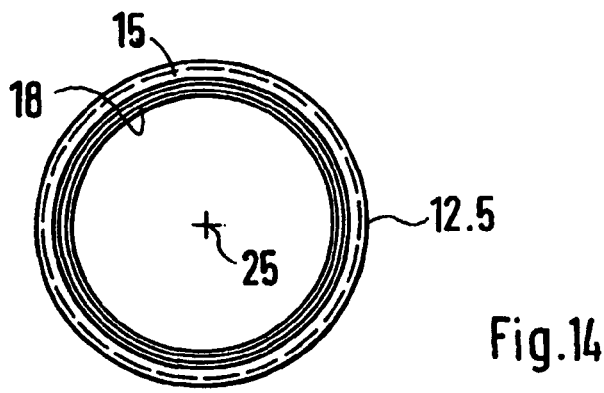
FIG. 14 shows a plan view from a front end with the tapered end section on the sleeve-shaped cover.
Figure 15:
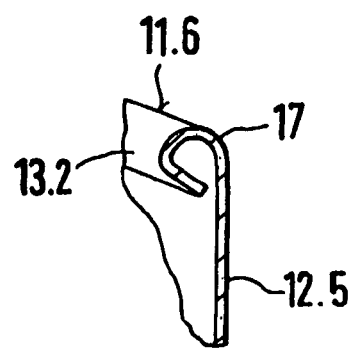
FIG. 15 shows a crimped end of the beveled front end of the finished cover in an enlarged partial view.

It is thus possible to produce in a cost-effective way and without worsening the shining surface a one-piece cover 10.7 from a special steel circular blank 10 in FIG. 1, which is made of a material which can be deep-drawn, as shown in FIGS. 13 to 15.

Here, FIG. 13 shows a vertical section through the finished cover 10.7 with the crimped drain 17 on the inclined front face 11.6, with the hole 13.2 and the tapered end section 18 at the cut-off front end 15. The sectional view also shows the wall thickness of the cover 10.7, which is obtained by a material which is approximately 1 to 1.2 mm thick, but can compulsorily also have different thicknesses, caused by the various processing steps.

FIG. 14 shows the view into the hollow space formed by the cover 10.7, which is used as a receiver for the end of a motor vehicle exhaust pipe, from the direction of the front face 15.

Finally, a portion of the crimped circular end 17 is shown in an enlarged view in FIG. 15.

The invention claimed is:

1. A method for producing a cover for an end of a motor vehicle exhaust pipe, the method steps directly following each other and including:
    a) making a circular blank (10) from a steel plate,
    b) drawing in a plurality of deep-drawing operations a plurality of cup-shaped beakers (10.1, 10.2, 10.3, 10.4) each with a bottom (11.4) inclined with respect to a longitudinal axis (25), and having diameters (D1, D2, D3, D4) that are uniform over an entire length (L1, L2, L3, L4) of a shell (12.4), but are decreased and the shell lengths (L1, L2, L3, L4) are increased upon each of the deep drawing operations, resulting in a beaker with a bottom (11.4) inclined with respect to a longitudinal axis (25),
    c) punching a centered hole (13) through the bottom (11.4) of the beaker and leaving a rim (14) which is ring-shaped around the hole (13) and between the hole (13) and the shell (12.4),
    d) cutting the shell (12.4) vertically with respect to the longitudinal axis (25) of the beaker to a required length (Lo) and cutting a condensate drain opening (16) and a fastening hole into the shell,
    e) bending the rim (14) of the bottom (11.4) parallel with respect to the longitudinal axis (25) and subsequently crimping into the beaker to form an end (17) shaped as an arc of a circle, and
    f) tapering an end section (18) on the cut open front (15) of the beaker for decreasing the diameter.

2. The method in accordance with claim 1, wherein a transition from the inclined bottom to the shell of the deep-drawing operations is rounded.

3. The method in accordance with claim 2, wherein the bottom with respect to the shell of the deep-drawing operations is inclined approximately 70° or 110° relative to the longitudinal axis (25).

4. The method in accordance with claim 3, wherein cutting off the shell (12.4) to the required length (Lo) and cutting at least one of the condensate drain opening (16) and the fastening hole are performed together.

5. The method in accordance with claim 4, wherein the hole (13) in the bottom is shaved prior to crimping the end (15) in the shape of the arc of the circle.

6. A cover, produced in accordance with the method of claim 5, crimped in the shape of the arc of the circle, wherein an other front face (15) which extends perpendicularly with respect to the longitudinal axis (25) in an adjoining section (18) has a diameter smaller than the diameter (D4) of the remaining shell (12.4).

7. A cover, produced in accordance with the method of claim 1, crimped in the shape of the arc of the circle, wherein an other front face (15) which extends perpendicularly with respect to the longitudinal axis (25) in an adjoining section (18) has a diameter smaller than the diameter (D4) of the remaining shell (12.4).

8. The method in accordance with claim 1, wherein the bottom with respect to the shell of the deep-drawing operations is inclined of approximately 70° or 110° relative to the longitudinal axis (25).

9. The method in accordance with claim 1, wherein cutting off the shell (12.4) to the required length (Lo) and cutting at least one of the condensate drain opening (16) and the fastening hole are performed together.

10. The method in accordance with claim 1, wherein the hole (13) in the bottom is shaved prior to crimping the end (15) in the shape of the arc of the circle.

11. A method for producing a cover for an end of a motor vehicle exhaust pipe, the method steps directly following each other and including:

a) providing a circular blank from a steel plate;

b) drawing from the circular blank in a plurality of deep-drawing operations a cup-shaped beaker with a bottom inclined with respect to a longitudinal axis of the beaker, the beaker having a diameter that is uniform over an entire length of a shell extending from an outer edge of the bottom and parallel to the longitudinal axis;

c) punching a centered hole through the bottom of the beaker and leaving a ring-shaped rim around the hole and between the hole and the shell;

d) cutting the shell to a required length and cutting at least one of a condensate drain opening or a fastening hole into the shell;

e) bending the rim of the bottom in a direction toward the inside surface of the shell to form an end shaped as an arc of a circle; and f) tapering an end section of the beaker that is opposite the end shaped as an arc of a circle.

12. The method in accordance with claim 11, wherein each subsequent operation of the plurality of deep-drawing operations comprises a decreasing of a diameter of the shell and a corresponding increasing of a length of the shell.

* * * * *